United States Patent

Neubauer

[11] Patent Number: 5,673,955
[45] Date of Patent: Oct. 7, 1997

[54] PAN GRIPPER OR THE LIKE WITH SPRING ANCHOR

[75] Inventor: Alfred Neubauer, Langhorne, Pa.

[73] Assignees: Magic Mold Corporation, Hatfield, Pa.; Leonard M. Brenner Associates, Inc., Boca Raton, Fla.

[21] Appl. No.: 683,821

[22] Filed: Jul. 18, 1996

Related U.S. Application Data

[63] Continuation-in-part of Ser. No. 644,172, May 10, 1996, Pat. No. 5,669,647.

[60] Provisional application No. 60/002,923 Aug. 29, 1995.

[51] Int. Cl.$^6$ .............................. A47J 45/10; B25B 7/06
[52] U.S. Cl. .............................. 294/31.1; 81/416; 294/118
[58] Field of Search .............................. 294/8.5, 11, 16, 294/28, 29, 31.1, 32, 104, 106, 118; 24/662, 664; 81/415–417, 427, 427.5, DIG. 6; 403/111, 120, 145, 146, 163, 164, 291

[56] References Cited

U.S. PATENT DOCUMENTS

| | | |
|---|---|---|
| 767,403 | 8/1904 | Glover . |
| 908,947 | 1/1909 | Burkhart . |
| 1,657,348 | 1/1928 | Drumm . |
| 2,392,118 | 1/1946 | Cacarillo .............................. 294/118 X |
| 2,847,889 | 8/1958 | Cain .............................. 81/417 X |
| 3,551,963 | 1/1971 | Mosher . |
| 3,559,515 | 2/1971 | Kyser . |
| 4,579,473 | 4/1986 | Brugger . |
| 4,669,340 | 6/1987 | Igarashi . |
| 4,719,827 | 1/1988 | Igarashi . |
| 4,847,950 | 7/1989 | Coleman . |

Primary Examiner—Johnny D. Cherry
Attorney, Agent, or Firm—Schweitzer Cornman Gross & Bondell LLP

[57] ABSTRACT

A gripping device or the like, particularly for gripping hot pans. First and second movable members are formed by molding with structural plastic material. One of the members has a pivot post extending laterally and defining a pivot axis. The other movable member has a tubular pivot member, arranged for a close fit reception over the pivot post to pivotally join the two movable members. At least one pivot post and the tubular pivot member is integral with a movable member. The pivot post has an annular groove, and the tubular pivot member includes a plurality of integral, resilient locking tabs having portions projecting radially inward at a shallow angle to the pivot axis. The two movable members are assembled by forcing the tubular pivot member over the pivot post. The locking tabs are resiliently displaced outwardly during the assembly, and snap into place in the annular groove to positively lock the two parts together. A biasing spring feature is provided by forming facing annular recesses, around the pivot post and tubular pivot member, for the reception of a spring of "omega" configuration, which accommodates assembly of the device without pretensioning the spring. Each movable member includes a spring post for engaging the spring. One movable member includes an anchor element for securing one end of the spring in engagement with its spring post. The fully-stressed inside diameter of the spring is greater than the outside diameter of the tubular pivot member.

19 Claims, 3 Drawing Sheets

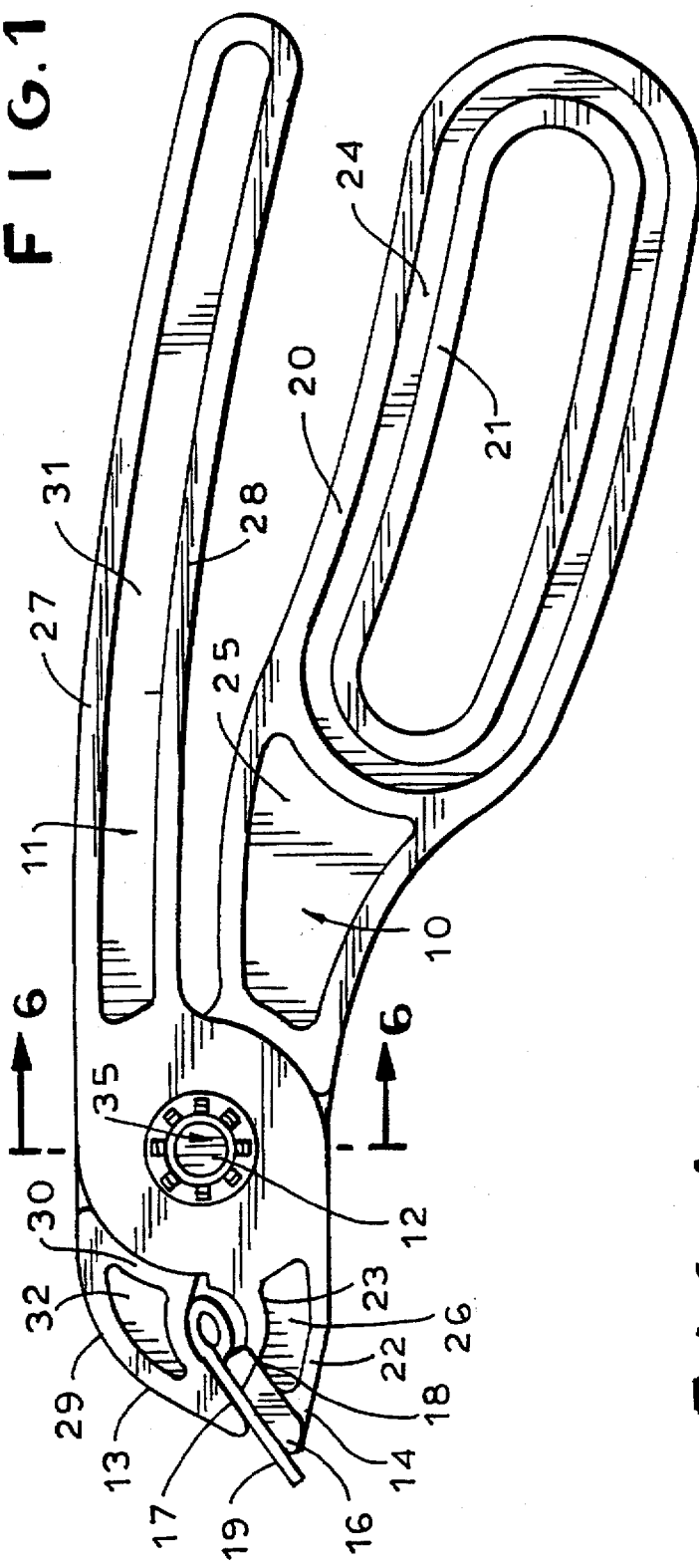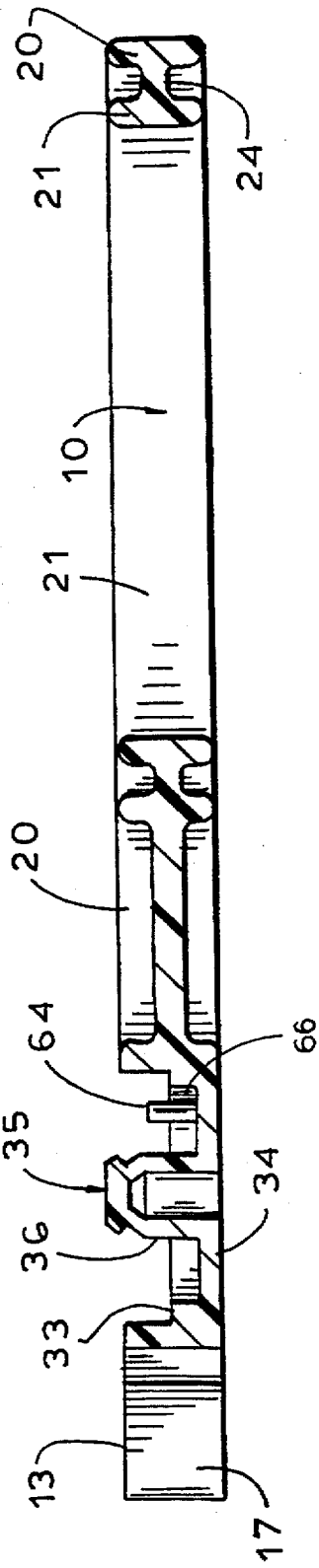

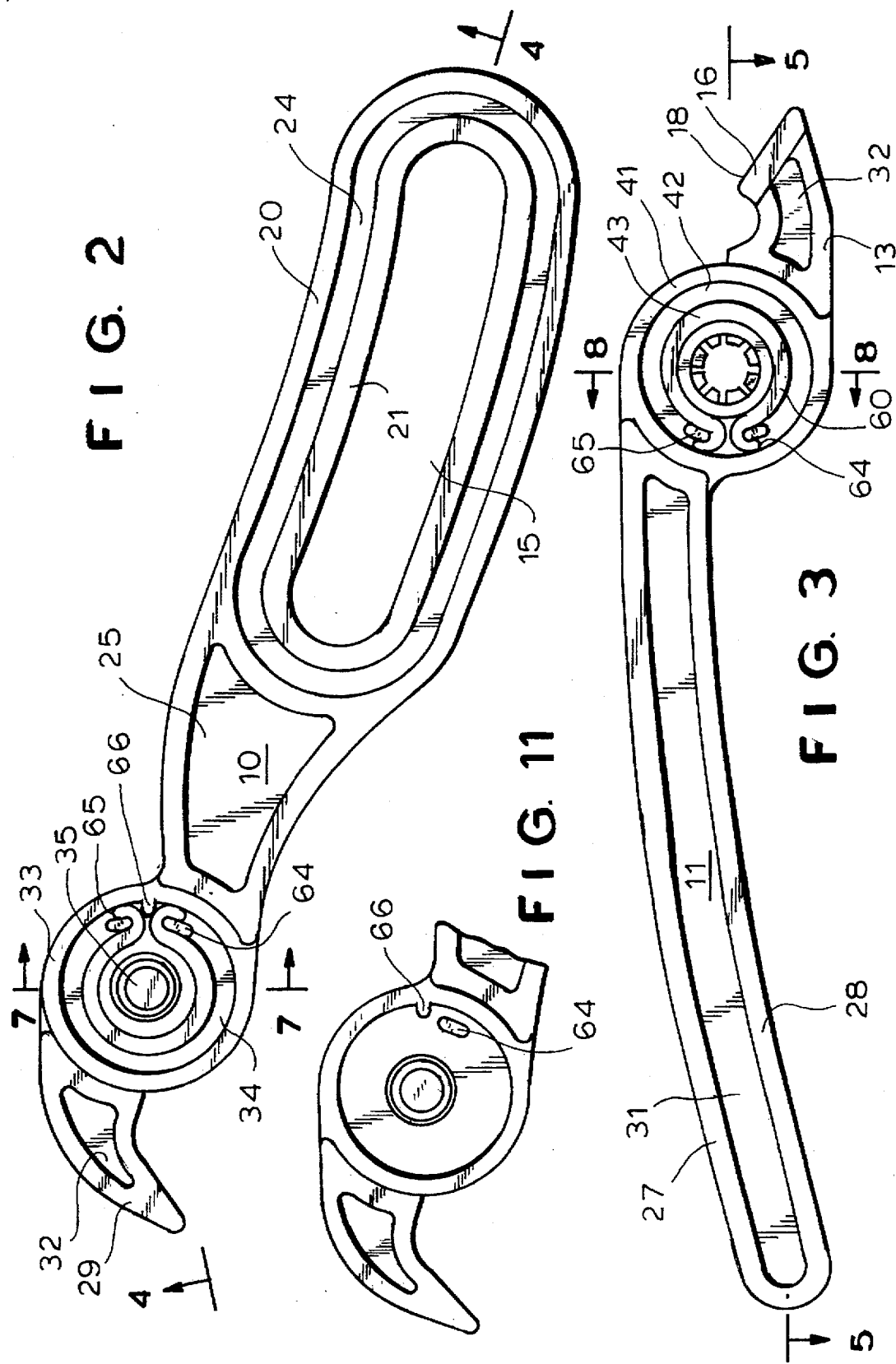

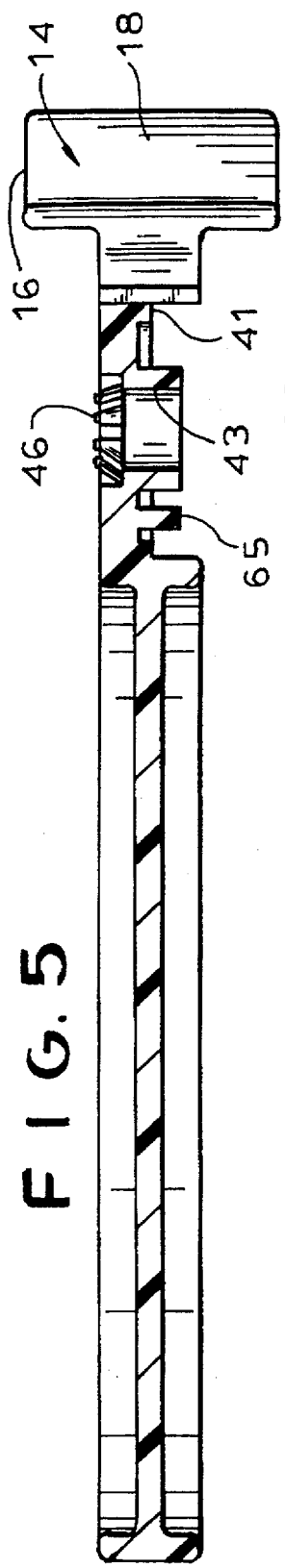
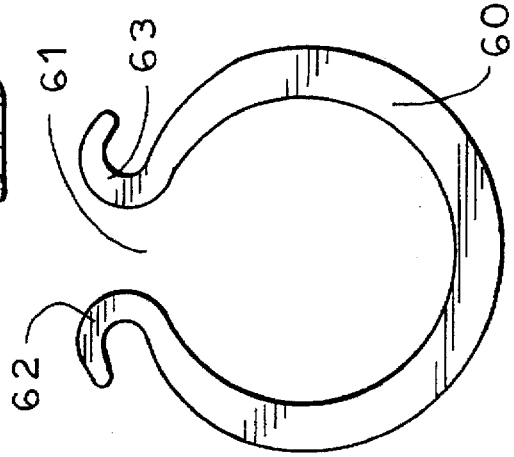
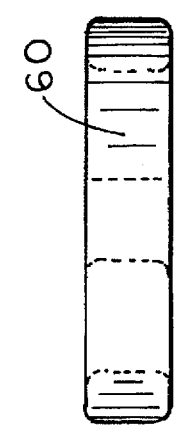
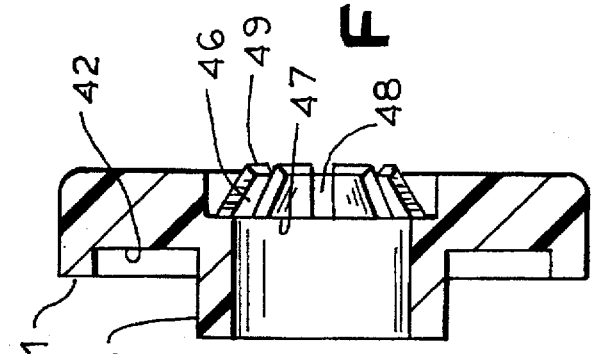
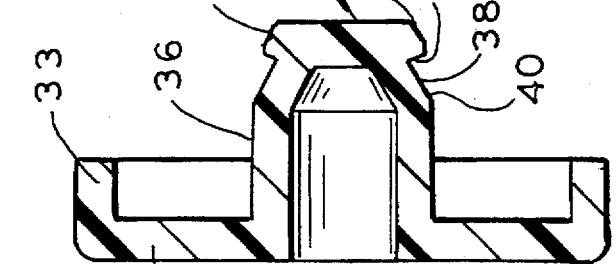
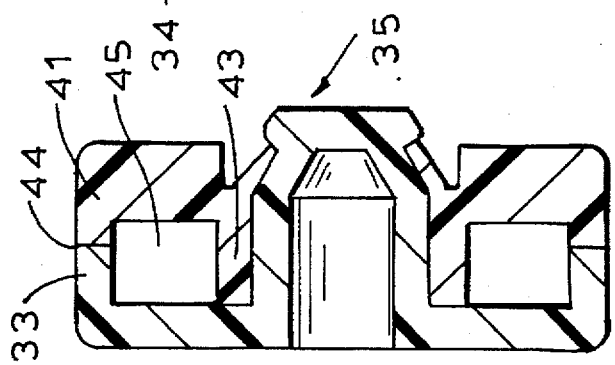

PAN GRIPPER OR THE LIKE WITH SPRING ANCHOR

RELATED APPLICATIONS

This is a Continuation-in-Part of my application Ser. No. 644,172, filed May 10, 1996, now U.S. Pat. No. 5,669,647 which claims the benefit of Provisional application Ser. No. 60/002,923, filed Aug. 29, 1995.

BACKGROUND AND SUMMARY OF THE INVENTION

The invention is directed specifically to a special purpose gripping device, although some of the principles of the invention have broader applicability, as will appear.

In the practices of the pizza industry, certain types of pizzas are prepared and baked in shallow metal pans, formed with a low sidewall and, typically, a beaded upper edge. The pizzas are placed in hot ovens for baking in the metal pans. When the baking is complete, the pizzas are removed by gripping and removing the hot metal pans.

To facilitate handling of the shallow pans, for placement in, and removal from the hot ovens, the industry has extensively employed a "pliers" style of gripping device. In accordance with widespread past practice, the preferred gripping device has comprised a pair of movable gripping elements, formed of cast aluminum, joined together on a pivot axis by a bolt or rivet. Typically, a spring element, of a more or less conventional type, is employed to bias the gripping jaws of the tool toward an open position.

Experience has indicated that the conventional pan gripping devices, as described above, tend to have a relatively short useful life. Being good conductors of heat, they are frequently dropped or otherwise roughly handled and tend easily to become broken or damaged. As a result, these items tend to represent an undesirably high cost factor to the pizza industry.

In accordance with the invention, a novel and improved design of pan gripping device is provided, in which all of the component parts are formed of injection molded plastic material, which is both lightweight and strong, and thus more easily used by the workers, and has good insulating qualities. Significantly, the elements forming a pivot connection between the two primary movable members of the gripping device can be integrally molded therewith in a unique and advantageous manner, which permits the two members to be joined by simply pressing them together to form a permanently assembled pivotal connection.

In a particularly preferred embodiment of the invention, one of the movable members is formed with an integral, laterally projecting pivot post, formed with a cylindrical bearing portion and an annular groove. The second movable member is formed with an integral, tubular pivot member, received over the pivot post, and formed with a plurality of resilient, inwardly inclined locking tabs. These locking tabs are displaced outwardly, during a press-together assembly of the parts, and snap into place in locking relation with the annular groove on the pivot post, when the parts are fully assembled.

For biasing the gripping jaws toward an open position, the device of the invention, in a preferred embodiment, incorporates a molded plastic spring, which is received in and endorsed by annular recesses molded into the principal moving members of the gripping device, in surrounding relation to the pivot post. The spring advantageously is in the form of a large arc of a circle, provided with hook-like formations at each end, somewhat in the form of the Greek letter "omega". Each of the pivotally connected members of the gripping device is formed with a spring post, engageable with the hook-like formations as the jaws of the device approach closed positions. The design of the device advantageously is such that the spring element may be simply placed in one of the recesses, prior to assembly of the two principal pivot members, without pretensioning or other special manipulation. An anchor post extending from one of the pivotally connecting members secures the spring during assembly.

Inasmuch as the entire device consists of few components, each capable of high speed, high precision manufacture by injection molding, and because assembly of the device requires little more than pressing the members together, after placement of the spring, the device may be manufactured and marketed at extremely low cost and in high volume.

For a more complete understanding of the above and other features and advantages of the invention, reference should be made to the following detailed description of a preferred embodiment of the invention and to the accompanying drawings.

DESCRIPTION OF THE DRAWINGS

FIG. 1 is an elevational view of an advantageous form of pan gripping device incorporating features of the invention.

FIG. 2 is an elevational view of one of two principal moving members of the device of FIG. 1.

FIG. 3 is an elevational view of a second of the two principal moving parts of the device of FIG. 1, viewed as from the opposite side of the view of FIG. 1.

FIGS. 4 and 5 are cross sectional views as taken generally on lines 4—4 of FIG. 2, and 5—5 of FIG. 3, respectively.

FIG. 6 is an enlarged, fragmentary cross sectional view as taken generally on line 6—6 of FIG. 1.

FIGS. 7 and 8 are enlarged, cross sectional views as taken generally along line 7—7 of FIG. 2, and line 8—8 of FIG. 3, respectively.

FIGS. 9 and 10 are a top plan and side elevational view, respectively, of a spring element employed advantageously in the device of FIG. 1.

FIG. 11 is a fragmentary elevational view of the moving member of FIG. 2, showing the anchor means.

DESCRIPTION OF A PREFERRED EMBODIMENT

Referring now to the drawings, and initially to FIG. 1 thereof, the illustrated embodiment of the invention is a specialty gripping device for handling shallow baking pans for the pizza industry. The device includes first and second handles 10, 11, joined at a pivot 12 and provided with respective gripping jaws 13, 14. In the illustrated form of the invention, the first handle 10 is formed with an opening 15 for receiving the fingers, while the second or upper handle 11 is preferably in the form of a straight lever. Pursuant to the desires and requirements of the pizza baking industry, the lower jaw 14 preferably is in the form of a wide flat stabilizing pad 16, while the upper jaw 13 can be in the form of a somewhat narrower pincer element. The respective working surfaces 17, 18 of the jaws preferably are disposed at an angle to the general disposition of the handles 10, 11, to facilitate gripping the sidewall 19 of a shallow baking pan.

The device of the invention desirably is formed by injection molding of a relatively heat resistant structural plastic, for example nylon. Considerable strength and stiffness is built into the device by following an I-beam style of construction. For example, the lower handle 10 is formed with a plurality of flange-like elements 20–23 integrally joined by web sections 24–26. Likewise, the upper handle member 11 is formed with flange elements 27–30, connected by web sections 31, 32.

In a preferred embodiment of the invention, elements for pivotally connecting the handles 10, 11 may be molded integrally with the handle elements themselves. To this end, the lower handle 10 is formed with a circular flange portion 33 (FIG. 2) integrally joined with a circular sidewall 34. In the center of the circular flange and wall is an integral pivot post, generally designated by the numeral 35. As shown in somewhat more detail in FIG. 7, the pivot post 35 has a cylindrical portion 36, which extends laterally from the circular sidewall 34, preferably to a point well beyond the outer edge of the circular wall 33. The cylindrical portion 36 forms the main pivot bearing of the device, as will appear.

The outer end portion of the pivot post 35 is comprised of an outer flange portion 37, which preferably is of smaller diameter than the cylindrical portion 36. Intermediate the flange 37 and the cylindrical portion 36 is an annular groove 38, of generally V-shaped cross sectional configuration formed by an annular abutment surface 39 and an annular guide surface 40, as shown particularly in FIG. 7.

The remainder of the pivot joint advantageously is molded integrally with the upper handle 11, which is formed with a circular flange 41 (FIG. 3) extending laterally from a circular sidewall 42. Extending laterally from the sidewall 42, and preferably integrally therefrom, is a cylindrical tubular bearing section 43, the length and diameter of which enable it to be slipped over the cylindrical portion 36 of the pivot post to provide a sturdy pivot connection.

As reflected particularly in FIG. 6, the respective dimensions of the circular flanges 33, 41, and the length and positioning of the cylindrical bearing section 43 are such that, when the bearing section 43 is fully seated on the pivot post 35, the circular flanges 33, 41, which are of the same diameter, substantially meet at their outer edges, as at 44 in FIG. 6, defining a closed annular chamber 45, the function of which will be further described. The abutting engagement of the circular flanges 33, 41 also adds great stability to the pivot joint.

Referring again to FIG. 8, the integral bearing structure of the handle member 11 includes a plurality of integrally formed, resilient, inwardly inclined locking tabs 46, which surround the inner end 47 of the cylindrical bearing portion 43. There are a plurality (for example eight) of such locking tabs arrayed around the outer edge of the cylindrical member 43, with spaces 48 formed between adjacent tabs.

To advantage, the individual locking tabs 46 project inward, toward the central axis of the pivot at a shallow angle of, say, 30°. The angle of the annular guide surface 40 of the pivot pin is formed at approximately the same angle. The outer end extremities 49 of the locking tab are disposed generally at right angles to the bodies of the locking tabs, to form locking abutment surfaces. These surfaces 49 are arranged to be in butting relationship with the annular surface 39 forming outer portions of the annular groove 38 on the pivot post 35.

Preferably, the outermost portion of the pivot post 35 is of slightly smaller diameter than the cylindrical portion 36 and is formed with an inwardly tapered guide surface 50.

As can be seen in FIGS. 6, 7 and 8, assembly of the two handle portions 10, 11, to form a complete, pivotally joined gripping device or the like, is accomplished simply by applying the bearing portion 43 of the upper handle member 11 axially over the pivot post 35, and pressing the parts together with sufficient force to deflect outwardly the locking tabs 46 as they pass over the outer flange 37 of the pivot post. The tapered guide surface 50 assists in guiding and deflecting the locking tabs as the assembly operation proceeds. Once the locking tabs pass the outer portions of the flange 37, and elastically return to their normal positions, the abutment surfaces 49 are firmly locked behind the annular locking surface 39, as shown clearly in FIG. 6, preventing subsequent disassembly of the device. Thus, a pivotally operated gripping device is capable of exceptionally economical manufacture, by simply molding the parts of the device in the manner described and pressing the parts together.

Most advantageously, a gripping device designed for the handling of pans for the pizza industry includes a means for biasing the gripping device to a slightly open position, sufficient to enable the gripping device to be applied over the edge of a baking pan without the operator having to manually open the jaws. To this end, the device of the invention incorporates a novel form of biasing spring arrangement, including a spring 60 (FIGS. 9 and 10) preferably formed of molded nylon or Celcon, similar to the material of the handles 10, 11. As shown in FIG. 9, the spring 60 advantageously is of generally circular form, constituting the major portion of a generally circular arc, but provided with a separation at one side, as at 61. The opposite end portions of the spring, which define the separation 61, are hook-like elements 62, 63. In general, the spring 60 has a configuration similar to the letter "omega".

The at-rest inside dimension of the spring 60 is somewhat greater than the outside diameter of the tubular bearing portion 43, and the outside dimension of the spring is desirably somewhat less than the inside diameter dimensions of the respective circular flanges 33, 41, so that the spring fits easily into the annular chamber 45. By way of example only, in a specific form of the device, the chamber 45 may have an inside diameter of 0.70 in. and an outside diameter of 1.30 in., while the spring 60, unstressed, may have an inside diameter of 0.85 in. and an outside diameter of 1.13 in.

Also, when the gripping device is closed and the spring is fully stressed, the inside dimension of spring 60 (see FIG. 3) is preferably somewhat greater than the outside diameter of tubular bearing portion 43, so that the gripping device may be fully closed without binding the spring against tubular bearing portion 43.

Each of the handle members 10, 11 is formed with spring post 64 and 65 (FIGS. 2 and 3), respectively, which preferably have oval cross sections, which are complementary to the shape of the hook-like elements 62, 63 of the spring 60. Also, one of the handle members (such as 10 in FIG. 2) is formed with an anchor post 66. The spring posts 64, 65 extend laterally from the respective circular sidewalls 34, 42 and project into the annular chamber 45. The location of the respective spring posts 64, 65 is such that, when the jaws of the gripping device are well open, with the handles disposed at an angle of, say, 30° open, the circumferential spacing between the respective spring posts exceeds the distance between the hook portions 62, 63 of the spring 60 in its at-rest or unstressed condition. Thus, to assemble the entire gripping device, including the biasing spring 60, the spring may be simply laid into the annular recess formed by one of the members, with the hook portions 62 or 63 of the spring engaging the spring post 64 or 65 of that member. The second handle member is then assembled with the first while being disposed in an open configuration such that there is clearance between its spring post and the second hook portion of the spring member. The spring is not under any stress or tension during the assembly and thus does not interfere with the assembly nor require any special operations to be performed.

The locations of the respective spring posts 64, 65 are such that, as the respective gripping jaws 13, 14 approach a fully closed condition, the hook portions 62, 63 of the spring 60 are engaged by the respective spring posts, placing the spring under circumferential tension, and biasing the jaws back to a slightly open position, as soon as gripping pressure is released.

To particular advantage, an anchor element 66 may be associated with one of the spring posts 64 (see FIGS. 2 and 11). The location of the anchor element 66 is such that, when spring 60 is inserted into the handle member 10, the hook 63 is trapped between the spring post 64 and the anchor element 66 thereby anchoring one end of the spring 60 and preventing its free rotation within the annular chamber 45 during assembly and at all other times. This facilitates the assembly operation by fixing the location of the spring 60 with respect to one of the handles while the other handle is being attached.

The device of the invention represents a vast improvement over existing devices available to the pizza baking industry. The device can be easily mass produced at extremely low cost, partly because the elements thereof can be injection molded from plastic material, and partly because the assembly of the device can be accomplished with extraordinary efficiency. Whereas the typical gripping device or the like employs a bolt, rivet or the like to form a pivotal connection between the two parts, all the pivot elements of the new device are molded integrally with the handle members themselves, and assembly is accomplished by merely pressing one part together with the other. In addition, the biasing spring may be included in the assembly, by simply laying the spring in place in an annular recess provided therefor in the respective handle members, and then pressing the two handle members together to form the permanent pivot connection. No special tools or operations are required to install the biasing spring and make it operational.

It should be understood that the specific form of the invention herein illustrated and described is intended to be representative only, as certain changes may be made therein without departing from the clear teachings of the disclosure. In this respect, some of the principles of the invention are applicable to other types of gripping devices, and possibly even to devices such as low cost scissors, etc. Accordingly, reference should be made to the following appended claims in determining the full scope of the invention.

What is claimed is:

1. A gripping device having first and second movable members attached to one another by a pivotal connection, characterized by:
   (a) said movable members forming an annular chamber about said pivotal connection,
   (b) a spring received in said chamber, said spring having the form of a partial circle with hook-like elements at each end,
   (c) two spring posts, one extending from each of said movable members and into said annular chamber, each spring post being located to engage one of said hook-like elements of said spring, and
   (d) anchor means associated with one of said movable members and operative to position one of said hook-like elements of said spring relative to the spring post extending from the same movable member such that one end of said spring is substantially fixed relative to said same movable member.

2. A gripping device as in claim 1 wherein said annular chamber further comprises inside and outside diameters and wherein said spring further comprises, when at rest and when fully-stressed, inside and outside diameters between said inside and outside diameters of said annular chamber.

3. A gripping device as in claim 2 wherein:
   (a) said movable members are formed by molding with structural plastic material,
   (b) said pivotal connection includes a pivot post and a pivot member of tubular configuration, said tubular pivot member being adapted for close-fit reception over said pivot post for pivotally joining said first and second movable members,
   (c) at least one of said pivot post and said tubular pivot member being integral with one of said first and second movable members,
   (d) said movable members being formed with circular walls encircling and concentric with said pivot post,
   (e) the circular wall of one of said movable members being in sliding, abutting relation with the circular wall of the other of said movable members,
   (f) said spring posts being located such that when said gripping device is open, a circumferential distance between said spring posts exceeds a distance between said hook-like elements when said spring is unstressed thereby allowing said gripping device to be assembled without the need to prestress said spring, and
   (g) said spring posts being located such that when said gripping device is closed, said spring posts engage said hook-like elements and compress said spring such that a circumferential distance between said spring posts is less than a distance between said hook elements when said spring is unstressed thereby biasing said gripping device into an open position.

4. A gripping device as in claim 3 wherein said hook-like elements of said spring are outwardly-turned such that said spring is substantially omega-shaped.

5. A gripping device having first and second movable members and pivot means joining said movable members for pivotal movement, characterized by
   (a) at least one of said movable members being formed with a recess about said pivot means,
   (b) a spring member received within said recess,
   (c) said spring member having the form of a partial circle with hook-like elements at each end,
   (d) each of said movable members having a spring-engaging post projecting into said recess for engagement with said hook-like elements of said spring member when said movable members are moved in a first direction to a predetermined position, tending to bias said movable members in a second direction away from said predetermined position, and
   (e) one of said movable members having an anchor element projecting into said recess for anchoring one end of said spring member, one of said hook-like elements of said spring member being located between said anchor element and the spring-engaging post extending from said one movable member such that said one end of said spring is substantially fixed relative to said one movable member.

6. A gripping device as in claim 5 wherein:
(a) said movable members being formed by molding with structural plastic material,
(b) said pivot means further comprising a pivot post defining a pivotal axis and further comprising a pivot member of tubular configuration adapted for close-fit reception over said pivot post for pivotally joining said first and second movable members,
(c) at least one of said pivot post and said tubular pivot member being integral with one of said first and second movable members;
(d) said pivot post including an annular groove therein spaced from said first movable member,
(e) said tubular pivot member including a plurality of resilient locking tabs, spaced angularly about said tubular pivot member and having portions projecting radially inwardly toward an axis of said pivot means and at an acute angle with respect thereto,
(f) said locking tabs being resiliently outwardly displaceable during axial assembly of said tubular pivot member over said pivot post, and
(g) said inwardly projecting portions of said locking tabs being lockingly received in said annular groove to lock said movable members in pivotally connected relation.

7. A gripping device as in claim 6 wherein said pivot post is integral and in one piece with said first movable member.

8. A gripping device as in claim 6 wherein said tubular pivot member is integral and in one piece with said second movable member.

9. A gripping device as in claim 8 wherein said pivot post is integral and in one piece with said first movable member.

10. A gripping device having first and second movable members attached to one another by a pivot, characterized by
(a) a spring disposed around said pivot, said spring having the form of a partial circle with hook-like elements at each end,
(b) a spring post extending from each of said movable members, said spring posts being located to engage said hook-like elements of said spring, and said spring posts being located such that when said gripping device is open, a circumferential distance between said spring posts exceeds a distance between said hook-like elements when said spring is unstressed thereby allowing said gripping device to be assembled without the need to prestress said spring,
(c) said spring posts being located such that, when said gripping device is closed, said spring posts engage said hook-like elements and compress said spring such that a circumferential distance between said spring posts is less than a distance between said hook elements when said spring is unstressed thereby biasing said gripping device into an open position, and
(d) an anchor element extending from one of said movable members, one of said hook-like elements being located between said anchor element and the spring post extending from said one movable member such that one end of said spring is substantially fixed relative to said one movable member.

11. A gripping device as in claim 10 wherein said pivot further comprises an outside diameter and wherein said spring further comprises, when fully-stressed, an inside diameter greater than said outside diameter of said pivot.

12. A gripping device as in claim 11 wherein:
(a) said movable members being formed by molding with structural plastic material,
(b) said pivot including a pivot post and a pivot member of tubular configuration, said tubular pivot member being adapted for close-fit reception over said pivot post for pivotally joining said first and second movable members, and
(c) at least one of said pivot post and said tubular pivot member being integral with one of said first and second movable members.

13. A gripping device as in claim 11 wherein said hook-like elements of said spring are outwardly-turned such that said spring element is substantially omega-shaped.

14. A gripping device as in claim 13 wherein:
(a) said pivot post includes an annular groove therein spaced from a body portion of one of said movable members,
(b) said tubular pivot member includes resilient locking means having portions projecting radially inwardly toward said axis of said pivot and at an acute angle with respect thereto,
(c) said locking means being resiliently outwardly displaceable during axial assembly of said tubular pivot member over said pivot post, and
(d) said inwardly projecting portions of said locking means being lockingly received in said annular groove to lock said movable members in pivotally connected relation.

15. A gripping device having first and second movable members attached to one another by a pivotal connection, characterized by:
(a) a spring disposed around said pivotal connection, said spring having the form of a partial circle with hook-like elements at each end,
(b) two spring posts, one extending from each of said movable members, each spring post being located to engage one of said hook-like elements of said spring, and
(c) anchor means for anchoring one of said hook-like elements of said spring with respect to one of said movable members.

16. A gripping device as in claim 15 wherein
(a) said spring posts are located such that when said gripping device is open, a circumferential distance between said spring posts exceeds a distance between said hook-like elements when said spring is unstressed thereby allowing said gripping device to be assembled without the need to prestress said spring, and
(b) said spring posts being located such that, when said gripping device is closed, said spring posts engage said hook-like elements and compress said spring such that a circumferential distance between said spring posts is less than a distance between said hook-like elements when said spring is unstressed thereby biasing said gripping device in an open position.

17. A gripping device as in claim 16 wherein:
(a) said movable members are formed with circular walls encircling and concentric with said pivotal connection,
(b) said circular walls being spaced radially outward of said pivotal connection to form an enclosed annular chamber with inside and outside diameters,
(c) said spring being received in said chamber, and
(d) said spring having, when at rest and when fully-stressed, inside and outside diameters between said inside and outside diameters of said annular chamber.

18. A gripping device as in claim 17 wherein:
(a) said movable members are formed by molding with structural plastic material, (b) the circular wall of one of said members being in sliding, abutting relation with the circular wall of the other of said members, (c) said pivotal connection including a pivot post and a pivot member of tubular configuration, said tubular pivot member being adapted for close-fit reception over said pivot post for pivotally joining said first and second movable members, (d) at least one of said pivot post and said tubular pivot member being integral to one of said first and second movable members, and (e) said anchor means comprises an anchor element associated one of said movable members, one of said hook-like elements being located between said anchor element and the spring post extending from said one movable member such that one end of said spring element is substantially fixed relative to said one movable member.

19. A gripping device as in claim 15 wherein said hook-like elements of said spring are outwardly-turned such that said spring element is substantially omega-shaped.

* * * * *